US008510682B2

(12) United States Patent
Kusterer et al.

(10) Patent No.: US 8,510,682 B2
(45) Date of Patent: Aug. 13, 2013

(54) UNIFYING NAVIGATION MODEL

(75) Inventors: Stefan Kusterer, Nussloch (DE); Yogev Mashiach, Alfe-Menashe (IL); David Brutman, Tel-Aviv (IL); Yossi Pik, Tel Aviv (IL); Mathias Kinzler, Heidelberg (DE)

(73) Assignee: SAP AG, Walldorf (DE)

( * ) Notice: Subject to any disclaimer, the term of this patent is extended or adjusted under 35 U.S.C. 154(b) by 2677 days.

(21) Appl. No.: 10/628,954

(22) Filed: Jul. 28, 2003

(65) Prior Publication Data

US 2005/0076311 A1    Apr. 7, 2005

Related U.S. Application Data

(60) Provisional application No. 60/435,644, filed on Dec. 20, 2002.

(51) Int. Cl.
*G06F 3/048* (2006.01)
*G06F 3/00* (2006.01)

(52) U.S. Cl.
USPC .......................................... 715/854; 715/853

(58) Field of Classification Search
USPC .................................. 715/853–854
See application file for complete search history.

(56) References Cited

U.S. PATENT DOCUMENTS

| | | | | |
|---|---|---|---|---|
| 6,049,828 | A * | 4/2000 | Dev et al. ...................... | 709/224 |
| 6,462,762 | B1 * | 10/2002 | Ku et al. ....................... | 715/853 |
| 6,643,661 | B2 * | 11/2003 | Polizzi et al. ................. | 707/100 |
| 7,028,306 | B2 * | 4/2006 | Boloker et al. ............... | 719/310 |
| 2003/0043200 | A1 | 3/2003 | Faieta et al. | |

FOREIGN PATENT DOCUMENTS

WO    WO 99/34306    7/1999

* cited by examiner

*Primary Examiner* — Nicholas Augustine
(74) *Attorney, Agent, or Firm* — Mintz Levin Cohn Ferris Glovsky and Popeo, P.C.

(57) ABSTRACT

Systems and techniques to provide a unifying navigation model with a navigation service that provides an interface to information sources. In general, in one implementation, the technique includes: uniting navigation hierarchies from different application sources, and providing a unified navigation area based on the united navigation hierarchy. Uniting the navigation hierarchies can involve supplying a navigation service with a navigation object model that provides, to a presentation layer, a homogeneous view of navigation information from the different application sources. Providing the unified navigation area can involve displaying a navigation window in a portal presentation, the navigation window including navigation links to resources of the different application sources, and the navigation links being organized according to the united navigation hierarchy.

27 Claims, 5 Drawing Sheets

FIG. 7

UNIFYING NAVIGATION MODEL

CROSS REFERENCE TO RELATED APPLICATIONS

This patent application claims the benefit of priority from U.S. Provisional Application entitled "UNIFYING NAVIGATION MODEL", filed Dec. 20, 2002, Application Ser. No. 60/435,644.

BACKGROUND

The following description relates to navigation of application objects in a networked environment, for example, navigation among application objects in a portal-based networked environment.

A portal brings together various applications from an intranet and an extranet that may or may not be related to one another. Each application typically has a different and isolated navigation model for use with the application's objects. An application's objects can be various resources, which can be presented in a display window in a graphical user interface (GU).

SUMMARY

The present disclosure includes systems and techniques relating to navigation of application objects in a networked environment. According to one aspect, these systems and techniques involve uniting navigation hierarchies from different application sources, and providing a unified navigation area based on the united navigation hierarchy. The systems and techniques described present an open architecture for unifying content from several applications into one navigation structure and enabling navigation hierarchy display. Objects of different applications accessed over a network can be united with a single navigation hierarchy. Navigation among the objects, and possibly among multiple display windows corresponding to the different applications, can be performed using the united navigation hierarchy. A single navigation area can be used to navigate uniformly among multiple windows corresponding to different applications. This navigation area can be presented in a portal, which can have one or more additional navigation areas (e.g., a top level navigation and a navigation panel). A user can navigate between applications and data from several sources, such as from Portal Pages and taxonomies from a Knowledge Management application.

A unified, consistent navigation hierarchy can be presented, and the unified navigation hierarchy can combine both the hierarchy created in a role editor of an enterprise portal, and an administrator-defined relational hierarchy (e.g., Drag&Relate functionality). Navigation for an end-user can be simplified and made more intuitive when accessing multiple applications through a portal. A purchaser of an enterprise portal can be provided with a navigation model that is customizable, allowing the creation of portals with navigation options tailored to a particular enterprise. Moreover, a navigation service application program interface (API) allows simple, transparent access to properties related to navigation in objects inside the role that are related to the navigation.

In one aspect, a technique, which can be implemented in a software product, involves uniting navigation hierarchies from different application sources by supplying a navigation service with a navigation object model that provides, to a presentation layer, a homogeneous view of navigation information from the different application sources. A unified navigation area can then be provided based on the united navigation hierarchy. Uniting the navigation hierarchies can involve accepting connectors for the different application sources, and receiving the navigation information from the different application sources through the connectors according to the navigation object model. Accepting connectors for the different application sources can involve receiving a registration request from a connector for a given application, where receipt of the registration request results in the navigation service having an identifier for the given connector, and receiving the navigation information can involve receiving navigation nodes, from the given connector, as defined by the navigation object model, where the received navigation nodes include the connector identifier.

The technique can also involve selecting a connector to contact based on a connector identifier from a navigation node in the united navigation hierarchy. Providing the unified navigation area can involve displaying a navigation window in a portal presentation, where the navigation window includes navigation links to resources of the different application sources, and where the navigation links are organized according to the united navigation hierarchy. The united navigation hierarchy can include navigation nodes defined by the navigation object model, and the technique can also involve receiving a navigation action, and changing at least one of the navigation nodes in accordance with the received navigation action.

Uniting the navigation hierarchies can also involve merging at least two navigation objects from the different application sources based on a merge identifier. The united navigation hierarchy can include a graph of linking relationships among navigation objects. Uniting the navigation hierarchies can also involve dynamically loading the united navigation hierarchy, and the technique can further involve enabling setting of a node as a new root of the united navigation hierarchy for display.

In another aspect, a portal system, which has a presentation level and a data level, includes a navigation service module including a navigation object model that provides a homogeneous view of navigation information from different application sources to the presentation level. The portal system also includes navigation connectors that operate with the different application sources to provide the navigation information from the data level to the navigation service module. The navigation connectors can include connector identifiers that are added to the navigation nodes generated by the navigation connectors to provide the navigation information. The navigation connectors can generate navigation nodes according to the navigation object model to provide the navigation information, and the navigation nodes can include at least one merge identifier that indicates similar content in two navigation nodes from different applications, which can be used to merge the two navigation nodes when processed by the system.

The navigation object model can define navigation nodes used to represent the navigation information from the different application sources. The navigation nodes can include a linking relationship to other nodes that are not in a parent child relationship in the homogeneous view of the navigation information. The navigation service module can be configured to read data from the different application sources using the navigation connectors, but not to write data to the different application sources using the navigation connectors. The navigation service module can dynamically load a united navigation hierarchy when providing the homogeneous view of the navigation information, and a role editor can allow setting a node as a new root of the united navigation hierarchy for display for users that belong to a role.

Details of one or more implementations are set forth in the accompanying drawings and the description below. Other features and advantages may be apparent from the description and drawings, and from the claims.

DRAWINGS DESCRIPTIONS

These and other aspects will now be described in detail with reference to the following drawings.

FIG. 7 illustrates an example page in a Web-based portal presentation.

Like reference symbols in the various drawings indicate like elements.

DETAILED DESCRIPTION

The systems and techniques described here relate to navigation of application objects in a networked environment. As used herein, the term "navigation" refers to information that facilitates transitioning from one object to another in a set of objects, such as electronic documents, in a user interface. Navigation activity includes browsing a hierarchical structure of units through expanding/collapsing containers and launching units.

The terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files, and an electronic document may be dynamically generated to represent an object being accessed.

A well designed navigation hierarchy can facilitate navigation actions and usability of a set of coordinated objects, such as the pages of a website. According to the systems and techniques described here, application objects accessed over a network can be united in a single navigation hierarchy and navigated among uniformly using one navigation area, such as a navigation area presented in a portal. Moreover, navigation nodes of the united navigation hierarchy can be merged according to merge information, allowing similar category content from different applications to be accessed together. A navigation node is a single navigation unit containing navigation properties, such as title, URL (Universal Resource Locator), Folder, Workset, Page, etc.

Figure 1:
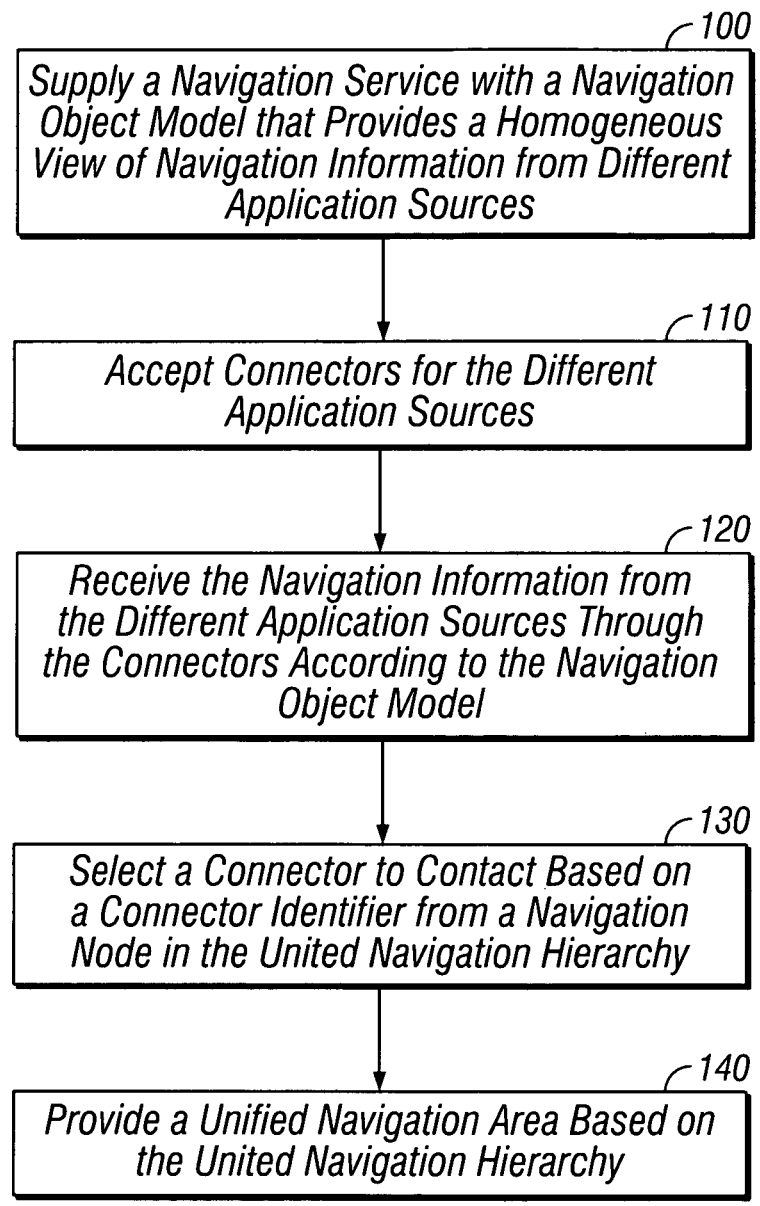
FIG. 1 illustrates unification of navigation hierarchies from different application sources.

FIG. 1 illustrates unification of navigation hierarchies from different application sources. A navigation service is supplied with a navigation object model that provides a homogenous view of navigation information from different application sources at 100. The navigation object model can include a defined connector interface to use in a connector service between a given application and the navigation service. The navigation object model can also include a defined navigation data interface to use in a presentation layer to access navigation information. The presentation layer can be provided with the homogeneous view of the navigation information from the different application sources through the defined navigation data interface of the navigation service. Thus, navigation hierarchies from the different application sources can be united for presentation, and applications that present navigation information can use the united navigation hierarchy and the navigation object model, while disregarding the particular source application of presented content.

Uniting the navigation hierarchies can involve using a connector service and a defined connector interface. Connectors for the different applications can be accepted at 110. The connectors can be software components implementing a connector service that uses the defined connector interface to connect an application with the navigation service. Accepting the connectors can involve receiving a registration request from a connector for a given application, where receipt of the registration request results in the navigation service having an identifier for the given connector. For example, the registration request can include a unique identifier of the given connector selected by the given connector.

The navigation information from the different application sources can be received through the connectors according to the navigation object model at 120. This receipt of the navigation information can involve receiving navigation nodes, from the given connector, as defined by the navigation object model. Navigation information can be provided to the presentation layer in the form of navigation nodes according to the defined navigation data interface of the navigation object model. Moreover, the navigation nodes can include the connector identifiers for the connectors from which they come.

A connector to contact can be selected at 130. This selection can be based on a connector identifier from a navigation node in the united navigation hierarchy. For example, each different application can have a connector that registers with the navigation service using a unique connector identifier, which may be specified by a system administrator. This unique connector identifier can be included in the navigation node(s) coming from this connector. For example, the navigation service can add the connector's identifier to the connector's node (e.g., by attaching the connector identifier as a prefix to a node name). This can ensure unique names for navigation nodes across the unified connectors and facilitate access to the navigation nodes. A connector to be contacted for access to a navigation node can be readily identified based on the included connector identifier (e.g., included as a name-prefix or a locator-prefix for the navigation node). A system administrator for a local installation can specify the unique connector identifiers for the different connectors in the local system; building the connectors can be done in a configuration user interface, which can be provided with system software, such as a Web-based portal system with system configuration and customization administrative user interfaces.

In addition, a unified navigation area can be provided based on the united navigation hierarchy at 140. For example, a navigation application in a presentation layer of an object navigation system can obtain navigation information from multiple different applications and present this navigation information according to the united navigation hierarchy in one or more windows making up the unified navigation area. The navigation application may or may not be directly associated with one of the different applications supplying content. For example, the navigation application can be designed specifically to present navigation information in a single window that can be used to navigate among objects from different applications in multiple different windows associated with the different applications. A navigation window can be displayed in a portal presentation, and the navigation window can include navigation links to resources of the different application sources, where the navigation links are organized according to the united navigation hierarchy.

Figure 2:
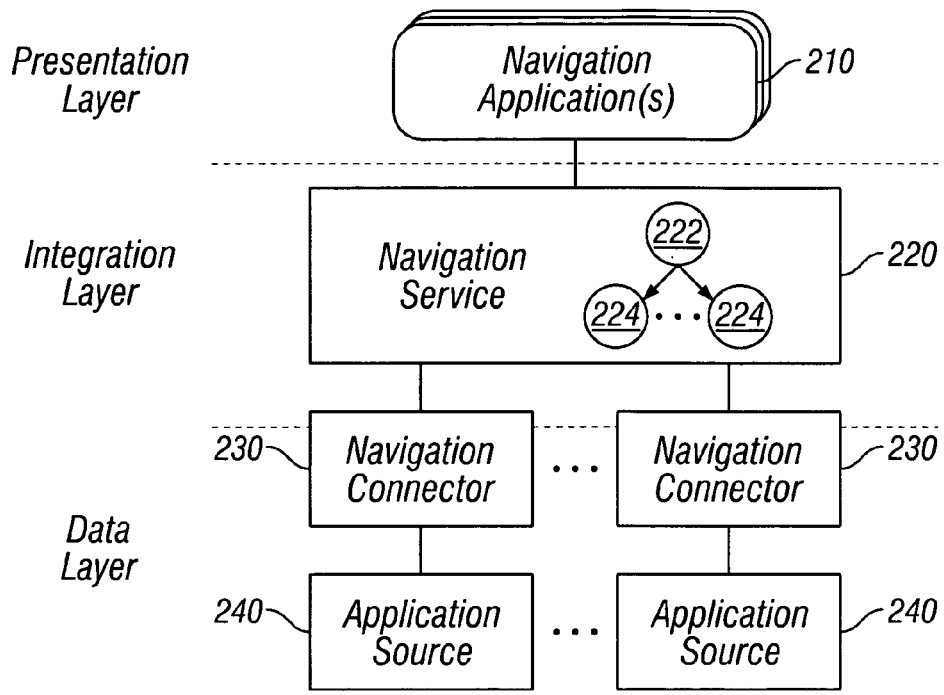
FIG. 2 illustrates a navigation model architecture.

FIG. 2 illustrates a navigation model architecture. One or more navigation applications 210 operate in a presentation layer of the navigation model architecture. As used herein, the term "application" means a software program, which is a collection of computing operations embodied by a set of instructions (e.g., one or more binary objects, one or more scripts, and/or one or more interpretable programs), which may form a stand alone application or a component of an application. Applications can be designed to operate with other applications and/or components. Both an application and a component may each be a separate process, even if their functionality is interrelated and they share a single execution context and a single set of resources. The navigation application(s) 210 can be stand alone applications or components of applications and can share an execution context or be given their own execution contexts.

The navigation application(s) 210 can obtain navigation information from a navigation service 220. The navigation service 220 operates in an integration layer and provides a homogenous view of navigation information from different application sources 240. The navigation application(s) 210 can use the navigation service 220 to get the navigation structure in the form of a tree or list of navigation nodes. The navigation service can store navigation information in the form of navigation nodes 220, 224 in a data structure representing a united navigation hierarchy. This data structure can include parent child relationships (e.g., the nodes 224 are children of the node 222) such as found in a tree structure but can also include other linking relationships that make the united navigation hierarchy into a generalized graph. For example, the navigation node interface can allow any relation that other objects might have to a navigation node, allowing a one to many relation in a navigation node indicating multiple related objects. The data structure can be accessed by calling objects that implement INavigationNode, which can be an interface defined by the navigation service.

A navigation node can include the following properties: Children, Related nodes, Title, LaunchURL, Visualization, ShowExternal, and Window Size. A Drag&Relate is a script to be executed on a drop event that creates a linking relationship between two objects. In a Drag&Relate operation, an object from a current node can be dragged and dropped on a target node to create a relation such that the target node will be available in the context of the dragged object in the future. The navigation node can include linking relationship information created by a Drag&Relate operation or other linking operation.

Each application 240 operates in a data layer of the architecture and can provide a navigation connector 230 to the navigation service 220. These connectors can be provided as plug-ins to the navigation service. The navigation connectors 230 can implement an interface (e.g., INavigationConnector) that is defined by the navigation service 220. The applications 240 can provide connectors 230 to the navigation service 220 by implementing the defined connector interface and generating navigation nodes representing data objects according to a navigation data interface. In the example implementation described below, INavigationConnector represents the connector interface between the application sources 240 and the navigation service 220, and INavigationNode represents the navigation data interface between the navigation service 220 and the navigation application(s) 210.

The navigation service 220 can access each of the connectors 230 in the same way, and collect navigation information from all of them. The navigation service can unite the navigation information provided by all the connectors and enable navigation clients to use the navigation service to access the united navigation information. The navigation service can give the root of the united navigation hierarchy as INavigationNode based on the environment and enable the navigation application(s) to investigate the hierarchy using the INavigationNode interface methods.

A unified, consistent navigation hierarchy can be presented that combines hierarchies created in multiple different applications. Navigation can be simplified for the end-user by presenting a unified navigation hierarchy that makes clear where a user is and the range of available navigation options from the different applications. The navigation model architecture can be implemented in a portal-based network environment and can provide customers with a customizable navigation model, where a customer can create Portals with different navigation themselves (e.g., navigation hierarchies that build on the united navigation hierarchy from the different applications).

Because of the unifying navigation model architecture, the presentation level doesn't need to know from which component in the data level the navigation data came from. The information views of navigation data can be shown homogenous navigation data that does not require knowing details of any particular source application. Thus, a portal can provide unified navigation over many content providers without requiring the user to think about what underlying application is being used. The navigation information looks homogeneous even though the information is generated by multiple different sources. The navigation service operates as a unification engine were the data coming from different sources are merged and harmonized.

Moreover, the architecture is readily scalable, allowing additional information providers to be plugged into an existing navigation infrastructure as needed. The connectors can provide navigation data in the form of navigation nodes. A navigation node is an independent navigation entity, such as described below, on which a navigation action can be performed. The navigation service defines a model for an abstract navigation that is flexible enough to allow many different applications to represent their navigation information as navigation nodes. New connectors that follow the rules specified by the navigation service can be created to allow new applications to be plugged into the navigation service.

The navigation architecture can provide a generic platform for creation of navigation models. A system administrator can implement their own navigation information views. An out-of-the-box navigation user interface can be provided, and an application program interface (API) can be provided to allow creation of navigation user interfaces above a role structure in a portal-based business management system. Two different navigation interfaces can be provided, one for intranet and one for extranet connections. The navigation architecture can include a user-data connector that provides the navigation service with a mechanism to set user-specific data. This mechanism can be used to save user-specific role definitions beyond the data retrieved from user roles in the portal-based system. The user-data connector can be an integral part of a portal-based implementation. The user-data connector can implement the IUserDataConnector, which can be defined by the navigation service. The user-data connector can supply user-specific documents and/or applications and can be a regular INavigationConnector.

The navigation model systems and techniques described here can be user-dependent. The user information can be passed between the different layers in an environment variable that includes the user ID. When a navigation iView uses the navigation service to retrieve a navigation node, an environment variable can be passed. The navigation service can also pass an environment variable to the relevant connector to get the a navigation connector node from it.

Figure 3:
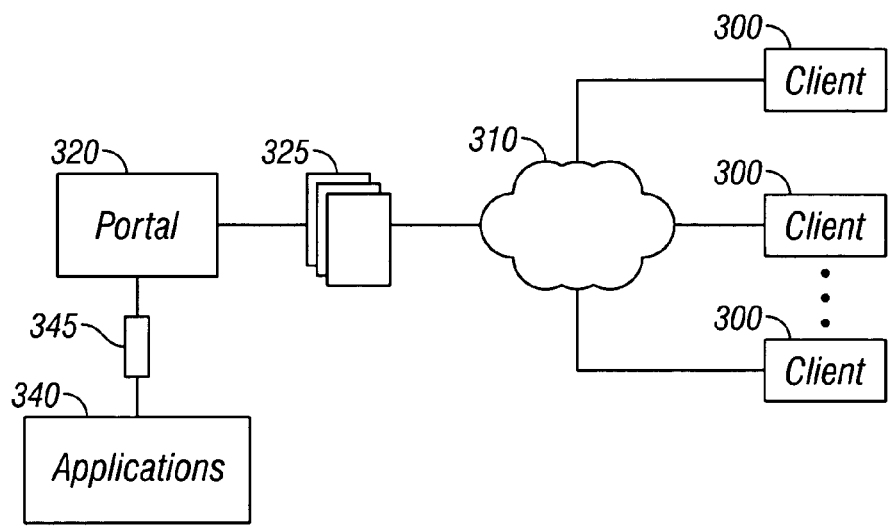
FIG. 3 illustrates a portal-based networked environment.

FIG. 3 illustrates a portal-based networked environment. Multiple clients 300 can access data over a network 310 through a portal 320. The network 310 can be any communication network linking machines capable of communicating using one or more networking protocols, e.g., a local area network (LAN), a wide area network (WAN), an enterprise network, a virtual private network (VPN), a mobile device network and/or the Internet. The clients 300 can be any machines or processes capable of communicating over the network 310. The clients 300 can be Web Browsers and can be communicatively coupled with the network 310 through a proxy server.

The portal 320 provides a common interface to applications 340. The portal 320 receives requests from the clients 300 and generates information views 325 (e.g., Web pages) in response. The portal 320 can implement a user-roles based system to personalize the common interface and the information views 325 for a user of a client 300. A user can have one or more associated roles that allow personalized tailoring of a presented interface through the generated information views 325. The portal 320 receives information 345 from the applications 340 to fulfill requests from the clients 300.

The portal 320 can be integrated with an enterprise management system that consolidates multiple application services. The integrated enterprise management system can provide integrated application services to manage business objects and processes in a business enterprise. The business objects and processes can be resources (e.g., human resources), development projects, business programs, inventories, clients, accounts, business products, and/or business services. The applications 340 can be many types of information sources, including Web services, document repositories, and/or enterprise base systems, such as human resource management systems, customer relationship management systems, financial management systems, project management systems, knowledge management systems, business warehouse systems, time management systems, and electronic file and/or mail systems. The integrated enterprise management system can also include an integration tool, such as the eXchange Infrastructure or the Business Warehouse provided by SAP AG of Walldorf, Germany. The integrated enterprise management system can consolidate and integrate the data and functionality of multiple different applications into a single enterprise management tool provided through the portal.

An enterprise portal and associated enterprise base systems can reside in one or more programmable machines, which can communicate over a network or one or more communication busses. For example, the enterprise portal can reside in one or more servers connected to a public network and can run one or more server software programs. The enterprise portal can include a portal platform in communication with a navigation platform accessed by the user. The portal platform can include a Web server, a page builder, and an information view (AKA, integration view or iView) server. The portal platform can also include a unification server, user management components (e.g., a Corporate LDAP (Lightweight Directory Access Protocol) Directory and a Portal LDAP Directory), and a database repository. The database repository can include an SQL (Structured Query Language) Database and a Portal Content Directory (PCD).

The database repository and user management components form at least part of a persistency layer for storage of the portal platform's metadata. This persistency layer can be used to implement the defined objects and interfaces described. For example, the PCD can have a semantic object used to implement INavigationNode and ILaunchTarget. Moreover, the enterprise portal can include, or be in communication with, various other enterprise systems, such as a knowledge management platform, a text retrieval and extraction server, and a business warehouse platform. The knowledge management platform can be software for data preparation, including workflow, publishing, feedback, analysis, discussion, querying, indexing, profiling, concurrency control, and classification functionality.

Figure 4:
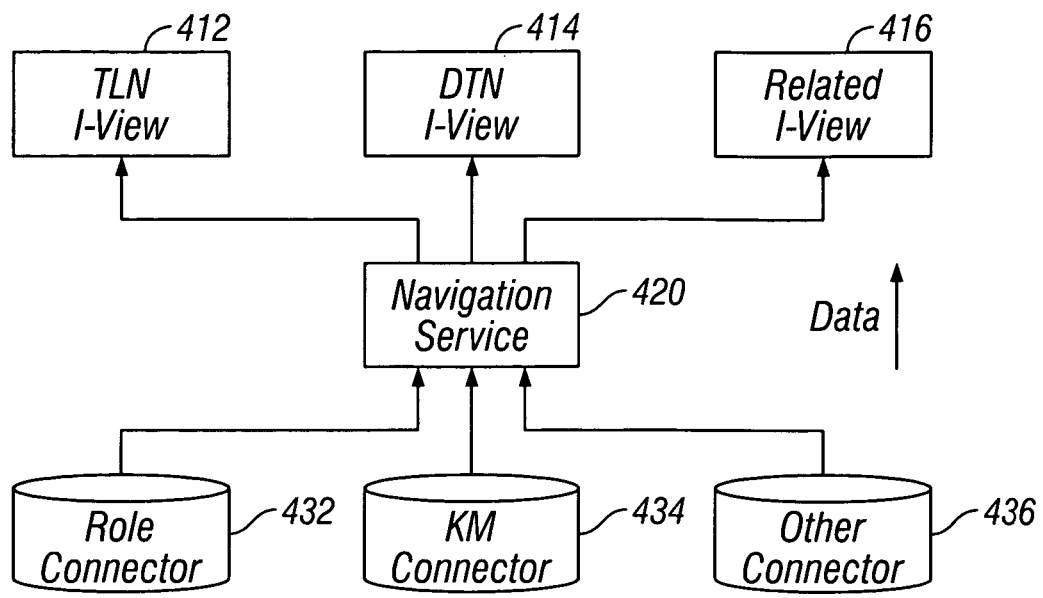
FIG. 4 illustrates a navigation model architecture in a portal-based networked environment.

FIG. 4 illustrates a navigation model architecture in a portal-based networked environment. A navigation service 420 provides a navigation service API to multiple iViews 412, 414, 416, and multiple connectors 432, 434, 436 interface with the navigation service 420 to supply data to the iViews. A traditional portal eventing model can be used for notification on navigation events. On a navigation user event, information about the selected node can be retrieved by investigating the node object (e.g., children, related iViews, visualization, etc). The API can be built to handle just reading of data and not writing. This can allow a content developer to develop a new navigational iView that uses the navigation service very quickly and easily.

The navigation service 420 provides an abstraction level between the data level and visualization level. Data origins can be made invisible to the navigation iViews, and the navigation iViews can be made invisible to the data origins. The abstraction level defines interfaces (rules/formats of interaction) for the navigation data provided to the iViews and the navigation connectors used to connect with different applications. Data requests can be implemented using the following procedures: getInitalNodes( ), getNode( ), and getFirstNode( ). The public interface of the navigation service can be defined as shown in Table 1:

TABLE 1

Public Interface of the Navigation Service public interface INavigationService
Title: Navigation Service Description: Interface for the Navigation Service. The Service
    provides navigation nodes to the navigation clients for instance navigation iViews.
--------------------------------------------------------------------------------
Field Summary
static java.lang.String KEY
Method Summary
   INavigationNode getFirstNode(java.util.Hashtable environment)
      Retrieves the first Navigation Node in the tree in the highest level of hiererchy.
   NavigationNodes getInitialNodes(java.util.Hashtable environment)
      Retrieves all the initial nodes from the highest hierarchical level from all Navigation
      Connectors registered to the navigation service.

TABLE 1-continued

Public Interface of the Navigation Service

INavigationNode getNode(java.util.Hashtable environment, java.lang.String nodeName)
    Retrieves a Navigation Node by it's hierarcial name.
Field Detail
KEY
public static final java.lang.String KEY
Method Detail
getInitialNodes
public NavigationNodes getInitialNodes(java.util.Hashtable environment)
          throws javax.naming.NamingExceptionRetrieves all the initial nodes
    from the highest hierarchical level from all Navigation Connectors registered to the
    navigation service.
Parameters:
environment - containing all environment params the initial nodes are requested for. must
    at least contain the username.
Returns:
a list of the initial nodes.
--------------------------------------------------------------------------------
getNode
public INavigationNode getNode(java.util.Hashtable environment,
          java.lang.String nodeName)Retrieves a Navigation Node by it's
    hierarcial name. The node's name represents a navigation node with the information
    concerning it's navigation connector.
Parameters:
nodeName - name of the requested node.
environment - containing all environment params the initial nodes are requested for. must
    at least contain the username.
Returns:
requested node or null if node wasn't found.
--------------------------------------------------------------------------------
getFirstNode
public INavigationNode getFirstNode(java.util.Hashtable environment)Retrieves the first
    Navigation Node in the tree in the highest level of hiererchy. If first node of highest
    level is not launch able, the first node in the second level is retrieved.
Parameters:
environment - containing all environment params the initial nodes are requested for. must
    at least contain the username.
Returns:
first node of highest level. If first node in highest level is not launch able, the first node in
    the second level is retrieved.
--------------------------------------------------------------------------------
public interface INavigationConnectorRegistration
Title: Navigation Connector Registration Description: Interface for the Navigation
    Connectors for registration and unregistration.
--------------------------------------------------------------------------------
Method Summary
void registerConnector(java.lang.String connectorKey, INavigationConnector connector)
    Registering a navigation connector to serve navigation nodes to the Navigation
        service.
void unregisterConnector(java.lang.String connectorKey)
    Unregistering a navigation connector from the navigation connectors context serving
        navigation nodes to the Navigation service.
Method Detail
registerConnector
public void registerConnector(java.lang.String connectorKey,
          INavigationConnector connector)Registering a navigation connector to
    serve navigation nodes to the Navigation service.
Parameters:
connectorKey - key of the connector. Will be used as the prefix of the navigation nodes
    URLs.
connector - connector object for registration for serving navigation nodes.
--------------------------------------------------------------------------------
unregisterConnector
public void unregisterConnector(java.lang.String connectorKey)Unregistering a navigation
    connector from the navigation connectors context serving navigation nodes to the
    Navigation service.
Parameters:
connectorKey - key of the connector as it was initially bind when registered.
--------------------------------------------------------------------------------
public interface INavigationGenerator
extends IClientNavigationGenerator
--------------------------------------------------------------------------------
Fields inherited from interface
    com.sapportals.portal.navigation.IClientNavigationGenerator
SHOW_EXTERNAL, SHOW_EXTERNAL_PORTAL, SHOW_INPLACE
    Method Summary
java.lang.String
        getPortalURL(com.sapportals.portal.prt.component.IPortalComponentRequest
        request, java.lang.String navTarget)

TABLE 1-continued

Public Interface of the Navigation Service

Creates a URL for a portal desktop with a navigation target as content.
Methods inherited from interface
    com.sapportals.portal.navigation.IClientNavigationGenerator
createAbsoluteNavigateClientCall, createObjectNavigateClientCall
Method Detail
getPortalURL
public java.lang.String
    getPortalURL(com.sapportals.portal.prt.component.IPortalComponentRequest
    request,
        java.lang.String navTarget)Creates a URL for a portal desktop with
    a navigation target as content.
Parameters:
request - portal request.
navTarget - the navigation url to navigate to.
Returns:
a URL for a portal desktop with the navigation target as content.
--------------------------------------------------------------------------------
public interface INavigationConstants
Title: Navigation Service Description: Service that coordinates the navigation Module
    operation
--------------------------------------------------------------------------------
Field Summary
static java.lang.String DEFAULT_NAV_CONNECTOR_URL_PREFIX
static int DRAGANDRELATE_TARGET
    Parameter defining the target is a Drag & Relate target.
static java.lang.String ENV_PRINCIPAL
static java.lang.String MERGED_ITEMS_SEPARATOR
static java.lang.String MERGED_NAME_END
static java.lang.String MERGED_NAME_START
static java.lang.String NAVIGATION_GET_CHILDREN
static java.lang.String NAVIGATION_GET_RELATED_DR_TARGETS
static java.lang.String NAVIGATION_GET_RELATED_NAV_ENTITIES
static java.lang.String NAVIGATION_GET_RELATED_SEE_ALSO
static java.lang.String NAVIGATION_PRINCIPAL
static java.lang.String ON_DROP_EVENT_HANDLER
    Constant describing on drag event Handler.
static int REGULAR_TARGET
    Parameter defining the target is a Regular target.
static int SHOW_EXTERNAL
    Parameter defining the launching of the navigation node will be performed in an
        external (new) STANDALONE window.
static int SHOW_EXTERNAL_PORTAL
    Parameter defining the launching of the navigation node will be performed in an
        external (new) PORTAL window.
static int SHOW_INPLACE
    Parameter defining the launch should take place in the same window.
static int TYPE_FOLDER
static int TYPE_IVIEW
static int TYPE_OTHER
static int TYPE_PAGE
static int TYPE_WORKSET
static java.lang.String URL_PREFIX_SEPARATOR
Field Detail
TYPE_IVIEW
public static final int TYPE_IVIEW
--------------------------------------------------------------------------------
TYPE_PAGE
public static final int TYPE_PAGE
--------------------------------------------------------------------------------
TYPE_FOLDER
public static final int TYPE_FOLDER
--------------------------------------------------------------------------------
TYPE_WORKSET
public static final int TYPE_WORKSET
--------------------------------------------------------------------------------
TYPE_OTHER
public static final int TYPE_OTHER
--------------------------------------------------------------------------------
SHOW_INPLACE
public static final int SHOW_INPLACE - Parameter defining the launch should take place
    in the same window.
--------------------------------------------------------------------------------
SHOW_EXTERNAL
public static final int SHOW_EXTERNAL - Parameter defining the launching of the
    navigation node will be performed in an external (new) STANDALONE window.
--------------------------------------------------------------------------------

TABLE 1-continued

Public Interface of the Navigation Service

SHOW_EXTERNAL_PORTAL
public static final int SHOW_EXTERNAL_PORTAL - Parameter defining the launching of
    the navigation node will be performed in an external (new) PORTAL window.
- - - - - - - - - - - - - - - - - - - - - - - - - - - - - - - - - - - - - - - - - - - - - - - - -
REGULAR_TARGET
public static final int REGULAR_TARGET - Parameter defining the target is a Regular
    target.
- - - - - - - - - - - - - - - - - - - - - - - - - - - - - - - - - - - - - - - - - - - - - - - - -
DRAGANDRELATE_TARGET
public static final int DRAGANDRELATE_TARGET - Parameter defining the target is a
    Drag & Relate target.
- - - - - - - - - - - - - - - - - - - - - - - - - - - - - - - - - - - - - - - - - - - - - - - - -
ON_DROP_EVENT_HANDLER
public static final java.lang.String ON_DROP_EVENT_HANDLERConstant describing on
    drag event Handler.
- - - - - - - - - - - - - - - - - - - - - - - - - - - - - - - - - - - - - - - - - - - - - - - - -
URL_PREFIX_SEPARATOR
public static final java.lang.String URL_PREFIX_SEPARATOR
- - - - - - - - - - - - - - - - - - - - - - - - - - - - - - - - - - - - - - - - - - - - - - - - -
DEFAULT_NAV_CONNECTOR_URL_PREFIX
public static final java.lang.String DEFAULT_NAV_CONNECTOR_URL_PREFIX
- - - - - - - - - - - - - - - - - - - - - - - - - - - - - - - - - - - - - - - - - - - - - - - - -
ENV_PRINCIPAL
public static final java.lang.String ENV_PRINCIPAL
- - - - - - - - - - - - - - - - - - - - - - - - - - - - - - - - - - - - - - - - - - - - - - - - -
NAVIGATION_PRINCIPAL
public static final java.lang.String NAVIGATION_PRINCIPAL
- - - - - - - - - - - - - - - - - - - - - - - - - - - - - - - - - - - - - - - - - - - - - - - - -
NAVIGATION_GET_CHILDREN
public static final java.lang.String NAVIGATION_GET_CHILDREN
- - - - - - - - - - - - - - - - - - - - - - - - - - - - - - - - - - - - - - - - - - - - - - - - -
NAVIGATION_GET_RELATED_SEE_ALSO
public static final java.lang.String NAVIGATION_GET_RELATED_SEE_ALSO
- - - - - - - - - - - - - - - - - - - - - - - - - - - - - - - - - - - - - - - - - - - - - - - - -
NAVIGATION_GET_RELATED_DR_TARGETS
public static final java.lang.String NAVIGATION_GET_RELATED_DR_TARGETS
- - - - - - - - - - - - - - - - - - - - - - - - - - - - - - - - - - - - - - - - - - - - - - - - -
NAVIGATION_GET_RELATED_NAV_ENTITIES
public static final java.lang.String NAVIGATION_GET_RELATED_NAV_ENTITIES
- - - - - - - - - - - - - - - - - - - - - - - - - - - - - - - - - - - - - - - - - - - - - - - - -
MERGED_NAME_START
public static final java.lang.String MERGED_NAME_START
- - - - - - - - - - - - - - - - - - - - - - - - - - - - - - - - - - - - - - - - - - - - - - - - -
MERGED_ITEMS_SEPARATOR
public static final java.lang.String MERGED_ITEMS_SEPARATOR
- - - - - - - - - - - - - - - - - - - - - - - - - - - - - - - - - - - - - - - - - - - - - - - - -
MERGED_NAME_END
public static final java.lang.String MERGED_NAME_END
- - - - - - - - - - - - - - - - - - - - - - - - - - - - - - - - - - - - - - - - - - - - - - - - -

The public interface of the navigation node can be defined as shown in Table 2:

TABLE 2

Public Interface of the Navigation Node public interface INavigationNode
Title: Navigation Node Description: Interface representing a single node in the Navigation
    module.
- - - - - - - - - - - - - - - - - - - - - - - - - - - - - - - - - - - - - - - - - - - - - - - - -
Method Summary
boolean contains(INavigationNode node)
    Check if node contains the node recieved as an argument (if merged using merge ID)
        or if similar to it.
java.lang.Object getAttributeValue(java.lang.String attributeName)
    Retrieves an attribute value from the connector node.
NavigationNodes getChildren( )
    Retrieves a list of node's children.
int getDragRelate( )
    Retrieves a value defining whether the node is Drag & Relate target.
java.lang.String getDropJScript( )
    Retrieves the script that needs to be executed when droping a link on the node.

TABLE 2-continued

Public Interface of the Navigation Node java.lang.String getDropJScriptId( )
    Retrieves the ID of the JavaScript code returned in getDragJScript( ) (for
        optimizations).
java.lang.String getDropPRTEvent( )
    Retrieves the PRT event that should be added to the iView's URL in case of a drop
        event.
int getExtWindowHeight( )
    Retrieves the height of the external window if node is defined to launch externally.
int getExtWindowWidth( )
    Retrieves the width of the external window if node is defined to launch externally.
java.lang.String getLaunchURL( )
    Retrieves the URL for launching the node.
java.lang.String getMergeID( )
    Retrieves the id for merging the node with other siblings
java.lang.String getName( )
    Retrieves the name of the node.
java.lang.String getNavConnectorNamePrefix( )
    Retrieves the node's navigation connector name prefix.
double getPriority( )
    Retrieves the priority of the node that allows sorting tabs etc.
javax.naming.NamingEnumeration getRelatedNavigationEntities( )
    Retrieves a list of nodes having NAVIGATION_GET_RELATED_NAV_ENTITIES
        relation with the node.
NavigationNodes getRelatedSeeAlsoNodes( )
    Retrieves a list of nodes having NAVIGATION_GET_RELATED_SEE_ALSO
        relation with the node.
NavigationNodes getRelatedTargetNodes( )
    Retrieves a list of nodes having NAVIGATION_GET_RELATED_DR_TARGETS
        relation with the node.
int getShowType( )
    Retrieves a value indicating whether the node is to be launched in external window
        (SHOW_EXTERNAL) or in the portal framework page (SHOW_INPLACE).
java.lang.String getTitle(java.util.Locale locale)
    Retrieves the title of the node (to be displayed in the navigation UI).
int getVisualizationType( )
    Retrieves the visualization type for this Node.
java.lang.String getWindowName( )
    Retrieves the window Name in which the node will be launched if launched
        externally.
boolean isLaunchable( )
    Retrieves flag indicating whether the node can be launched.
boolean isMergible( )
    Retrieves flag indicating whether the node can be merged.
javax.naming.NamingEnumeration listBindings(java.lang.String name, java.lang.String
        mode)
    Enumerates the names bound in the named context, along with the objects bound to
        them.
Method Detail
getAttributeValue
public java.lang.Object getAttributeValue(java.lang.String attributeName)
        throws javax.naming.directory.NoSuchAttributeExceptionRetrieves
        an attribute value from the connector node.
Parameters:
attributeName - the attribute name for retrieval.
--------------------------------------------------------------------------
getTitle
public java.lang.String getTitle(java.util.Locale locale)Retrieves the title of the node (to be
        displayed in the navigation UI).
Parameters:
locale - locale requested for the title.
Returns:
title of the node.
--------------------------------------------------------------------------
getName
public java.lang.String getName( )Retrieves the name of the node. The name include a
        navigation connector key prefix and the internal URL of the navigation connector.
Returns:
the name of the node.
--------------------------------------------------------------------------
listBindings
public javax.naming.NamingEnumeration listBindings(java.lang.String name,
        java.lang.String mode)
        throws javax.naming.NamingExceptionEnumerates the names
    bound in the named context, along with the objects bound to them.

TABLE 2-continued

Public Interface of the Navigation Node

Parameters:
name - the name of the context to list.
mode - defining the relation between the node and the requested nodes list.
Returns:
enumeration of names and objects of nodes related to the node in the mode argument value.
---
getChildren
public NavigationNodes getChildren( )
        throws javax.naming.NamingExceptionRetrieves a list of node's children.
Returns:
children list of node's children.
Throws:
javax.naming.NamingException - If naming operation while looking for children throws
    exception.
---
getRelatedSeeAlsoNodes
public NavigationNodes getRelatedSeeAlsoNodes( )
        throws javax.naming.NamingExceptionRetrieves a list of nodes
    having NAVIGATION_GET_RELATED_SEE_ALSO relation with the node.
Returns:
list of nodes having NAVIGATION_GET_RELATED_SEE_ALSO relation with the node.
Throws:
javax.naming.NamingException - If naming operation while looking for nodes throws
    exception.
---
getRelatedTargetNodes
public NavigationNodes getRelatedTargetNodes( )
        throws javax.naming.NamingExceptionRetrieves a list of nodes
    having NAVIGATION_GET_RELATED_DR_TARGETS relation with the node.
Returns:
list of nodes having NAVIGATION_GET_RELATED_DR_TARGETS relation with the
    node.
Throws:
javax.naming.NamingException - If naming operation while looking for nodes throws
    exception.
---
getRelatedNavigationEntities
public javax.naming.NamingEnumeration getRelatedNavigationEntities( )
        throws javax.naming.NamingExceptionRetrieves a
    list of nodes having NAVIGATION_GET_RELATED_NAV_ENTITIES relation
    with the node.
Returns:
list of units having NAVIGATION_GET_RELATED_NAV_ENTITIES relation with the
    code.
Throws:
javax.naming.NamingException - If naming operation while looking for nodes throws
    exception.
---
getPriority
public double getPriority( )Retrieves the priority of the node that allows sorting tabs etc.
Returns:
the priority of the node.
---
getVisualizationType
public int getVisualizationType( )Retrieves the visualization type for this Node. Types are
    defined in the INAvigationConstants interface.
Returns:
constant representing the default visualization for displaying the node.
---
isLaunchable
public boolean isLaunchable( )Retrieves flag indicating whether the node can be launched.
Returns:
whether the node can be launched.
---
getLaunchURL
public java.lang.String getLaunchURL( )Retrieves the URL for launching the node.
Returns:
URL for launching the node.
---
getDragRelate
public int getDragRelate( )Retrieves a value defining whether the node is Drag & Relate
    target. Returns either REGULAR_TARGET or DRAGANDRELATE_TARGET.
    Constants defined in the INavigationConstants interface.
Returns:
value defining whether the node is Drag & Relate target.
---

TABLE 2-continued

Public Interface of the Navigation Node getDropJScript
public java.lang.String getDropJScript( )
        throws java.lang.UnsupportedOperationExceptionRetrieves the script
    that needs to be executed when droping a link on the node. This script would run on
    the JavaScript onDrop event.
Returns:
the Java script defined for the dragging event. null if no Jscript has been defined.
Throws:
java.lang.UnsupportedOperationException - if node does not support scripts for drop
    events.
--------------------------------------------------------------------------------
getDropJScriptId
public java.lang.String getDropJScriptId( )
        throws java.lang.UnsupportedOperationExceptionRetrieves the ID of
    the JavaScript code returned in getDragJScript( ) (for optimizations).
Returns:
the Java script id defined for the dragging event. null if no JScript has been defined.
Throws:
java.lang.UnsupportedOperationException - if node does not support scripts for drop
    events.
--------------------------------------------------------------------------------
getDropPRTEvent
public java.lang.String getDropPRTEvent( )
        throws java.lang.UnsupportedOperationExceptionRetrieves the PRT
    event that should be added to the iView's URL in case of a drop event.
Returns:
the PRT event that should be added to the iView's URL in case of a drop event.
Throws:
java.lang.UnsupportedOperationException - if node does not support scripts for drop
    events.
--------------------------------------------------------------------------------
getShowType
public int getShowType( )Retrieves a value indicating whether the node is to be launched in
    external window (SHOW_EXTERNAL) or in the portal framework page
    (SHOW_INPLACE). The constants are located in the INavigationConstants
    interafce.
Returns:
whether the node is to be launched in external window or in the portal framework page.
--------------------------------------------------------------------------------
isMergible
public boolean isMergible( )Retrieves flag indicating whether the node can be merged.
Returns:
whether the node can be merged.
--------------------------------------------------------------------------------
getMergeID
public java.lang.String getMergeID( )
        throws java.lang.UnsupportedOperationExceptionRetrieves the id for
    merging the node with other siblings
Returns:
the id for merging the node with other siblings.
Throws:
java.lang.UnsupportedOperationException - if node does not support merging.
--------------------------------------------------------------------------------
getWindowName
public java.lang.String getWindowName( )
        throws java.lang.UnsupportedOperationExceptionRetrieves the window
    Name in which the node will be launched if launched externally.
Returns:
the window Name in which the node will be launched.
Throws:
java.lang.UnsupportedOperationException - Window name is not supported or node
    defined to be launched in portal framework page.
--------------------------------------------------------------------------------
getExtWindowHeight
public int getExtWindowHeight( )
        throws java.lang.UnsupportedOperationExceptionRetrieves the height of the
    external window if node is defined to launch externally. The measurment unit is
    pixel.
Returns:
the height of the external window if launched externally.
Throws:
java.lang.UnsupportedOperationException - width is not supported or node defined to be
    launched in place.
--------------------------------------------------------------------------------

TABLE 2-continued

Public Interface of the Navigation Node getExtWindowWidth
public int getExtWindowWidth( )
    throws java.lang.UnsupportedOperationExceptionRetrieves the width of the
    external window if node is defined to launch externally. The measurment unit is
    pixel.
Returns:
the width of the external window if launched externally.
Throws:
java.lang.UnsupportedOperationException - width is not supported or node defined to be
    launched in place.
--------------------------------------------------------------------------------
getNavConnectorNamePrefix
public java.lang.String getNavConnectorNamePrefix( )Retrieves the node's navigation
    connector name prefix.
Returns:
node's navigation connector name prefix.
--------------------------------------------------------------------------------
contains
public boolean contains(INavigationNode node)Check if node contains the node recieved
    as an argument (if merged using merge ID) or if similar to it.
Parameters:
node - navigation node for checking (result of merging operation done using the merge ID
    of the nodes).
Returns:
true node is contained in object or similar to it false node is not contained in object and not
    similar to it
--------------------------------------------------------------------------------
public class NavigationNodes
extends java.util.ArrayList
Title: Navigation Nodes data structure Description: Array List containing Navigation
    nodes.
--------------------------------------------------------------------------------
Constructor Summary
NavigationNodes( )
Method Summary
boolean add(INavigationNode node)
    Convenience method; adding of an INavigationNode object.
void add(int index, java.lang.Object element)
    Override the add method to make sure only NavigationNode elements are added.
boolean add(java.lang.Object element)
    Overrides the add method to make sure only INavigationNode elements are added.
    Methods inherited from class java.util.ArrayList
addAll, addAll, clear, clone, contains, ensureCapacity, get, indexOf, isEmpty, lastIndexOf,
    remove, set, size, toArray, toArray, trimToSize
    Methods inherited from class java.util.AbstractList
equals, hashCode, iterator, listIterator, listIterator, subList
    Methods inherited from class java.util.AbstractCollection
containsAll, remove, removeAll, retainAll, toString
    Methods inherited from class java.lang.Object
getClass, notify, notifyAll, wait, wait, wait
    Methods inherited from interface java.util.List
containsAll, equals, hashCode, iterator, listIterator, listIterator, remove, removeAll,
    retainAll, subList
Constructor Detail
NavigationNodes
public NavigationNodes( )Method Detail
add
public boolean add(java.lang.Object element)Overrides the add method to make sure only
    INavigationNode elements are added.
Overrides:
add in class java.util.ArrayList
--------------------------------------------------------------------------------
add
public void add(int index,
        java.lang.Object element)Override the add method to make sure only
        NavigationNode elements are added.
Overrides:
add in class java.util.ArrayList
--------------------------------------------------------------------------------
add
public boolean add(INavigationNode node)Convenience method; adding of an
    INavigationNode object.
Parameters:
node - the navigation node to ne added to the collection
--------------------------------------------------------------------------------

The public interface of the navigation connector can be defined as shown in Table 3:

TABLE 3

Public Interface of the Navigation Connector public interface INavigationConnector
Title: Navigation Connector interface Description: Interface that Navigation connectors to semantic application should implement it. Required to be singleton.
---
Method Summary
javax.naming.NamingEnumeration getInitialNodes(java.util.Hashtable environment)
    Retrieves all the initial nodes of the connector.
INavigationConnectorNode getNode(java.util.Hashtable environment, java.lang.String
        connectorNodeName)
    Retrieves a Navigation Node by it's name.
javax.naming.NamingEnumeration getNodes(java.util.Hashtable environment,
        java.util.Vector connectorNodeNames)
    Retrieves a Navigation Nodes which their names are contained in the received vector.
Method Detail
getInitialNodes
public javax.naming.NamingEnumeration getInitialNodes(java.util.Hashtable
        environment)Retrieves all the initial nodes of the connector.
Parameters:
environment - containing all environment params the initial nodes are requested for. must
        at least contain the username.
Returns:
bindings of INavigationConnectorNode objects.
---
getNode
public INavigationConnectorNode getNode(java.util.Hashtable environment,
            java.lang.String connectorNodeName)Retrieves a Navigation
        Node by it's name. The name contains information about the node location in the
        connector hierarchy.
Parameters:
environment - containing all environment params the initial nodes are requested for. must
        at least contain the username.
connectorNodeName - the hierarchy of the reuqested node.
Returns:
the requested node or null if wasn't found.
---
getNodes
public javax.naming.NamingEnumeration getNodes(java.util.Hashtable environment,
            java.util.Vector connectorNodeNames)Retrieves a Navigation
        Nodes which their names are contained in the received vector. The name contains
        information about the node location in the connector hierarchy.
Parameters:
environment - containing all environment params the initial nodes are requested for. must
        at least contain the username.
connectorNodeNames - list of the requested nodes names and objects.
Returns:
NamingEnumeration bindings of INavigationConnectorNode objects, if recieved nodes are
        not found, They are not returned.
---
public interface INavigationConnectorNode
Title: Navigation Service Description: Service that coordinates the navigation Module
---
Field Summary
static java.lang.String NAVIGATION_GET_CHILDREN
static java.lang.String NAVIGATION_GET_RELATED_DR_TARGETS
static java.lang.String NAVIGATION_GET_RELATED_NAV_ENTITIES
static java.lang.String NAVIGATION_GET_RELATED_SEE_ALSO
    Method Summary
java.lang.Object getAttributeValue(java.lang.String attributeName)
        retrieves am attribute from the connector node.
int getDragRelate( )
        Retrieves a value defining whether the target is Drag & Relate target.
int getExtWindowHeight( )
        Retrieves the height of the external window if node is defined to launch externally.
int getExtWindowWidth( )
        Retrieves the width of the external window if node is defined to launch externally.
java.lang.String getJScript(java.lang.String mode)
        retrieves the Java Script that needs to run when event described by the mode is fired.
java.lang.String getJScriptId(java.lang.String mode)
        Retrieves the ID of the JavaScript code returned in getDragJScript(mode) (for
            optimizations).
java.lang.String getLaunchURL(java.lang.String nodeName)
        retrieves the launch URL.
java.lang.String getMergeID( )
        Retrieves a value of the node's merge ID.

TABLE 3-continued

Public Interface of the Navigation Connector double getPriority( )
    returns the priority of the node that allows sorting tabs etc.
java.lang.String getPRTEvent(java.lang.String mode)
    Retrieves the PRT event that corresponds with the mode.
int getShowType( )
    Retrieves a value defining the node's show type.
java.lang.String getTitle(java.util.Locale locale)
    Retrieves the title of the node (to be displayed in the navigation UI).
int getVisualizationType( )
    returns the visualization type for this Node.
java.lang.String getWindowName( )
    Retrieves the window Name of the launched external window.
boolean isLaunchable( )
    returns whether the node can be launched.
boolean isMergible( )
    Retrieves a flag indicating whether node can be merged.
javax.naming.NamingEnumeration listBindings(java.lang.String name, java.lang.String
        mode)
    Enumerates the names bound in the named context, along with the objects bound to
        them.
Field Detail
NAVIGATION_GET_CHILDREN
public static final java.lang.String NAVIGATION_GET_CHILDREN
---
NAVIGATION_GET_RELATED_SEE_ALSO
public static final java.lang.String NAVIGATION_GET_RELATED_SEE_ALSO
---
NAVIGATION_GET_RELATED_DR_TARGETS
public static final java.lang.String NAVIGATION_GET_RELATED_DR_TARGETS
---
NAVIGATION_GET_RELATED_NAV_ENTITIES
public static final java.lang.String
    NAVIGATION_GET_RELATED_NAV_ENTITIESMethod Detail
listBindings
public javax.naming.NamingEnumeration listBindings(java.lang.String name,
        java.lang.String mode)
         throws javax.naming.NamingExceptionEnumerates the names
    bound in the named context, along with the objects bound to them.
Parameters:
name - the name of the context to list.
mode - defining the relation between the node and the requested nodes list.
Returns:
enumeration of names and objects of nodes related to the node in the mode argument value.
---
getAttributeValue
public java.lang.Object getAttributeValue(java.lang.String attributeName)
        throws javax.naming.directory.NoSuchAttributeExceptionretrieves
    am attribute from the connector node.
Parameters:
attributeName - the attribute name for retrieval.
---
isLaunchable
public boolean isLaunchable( )returns whether the node can be launched.
---
getTitle
public java.lang.String getTitle(java.util.Locale locale)Retrieves the title of the node (to be
    displayed in the navigation UI).
Parameters:
locale - locale requested for the title.
Returns:
title of the node.
---
getLaunchURL
public java.lang.String getLaunchURL(java.lang.String nodeName)retrieves the launch
    URL.
Parameters:
nodeName - the full name of the node. This parameter can be used in order to generate the
    launch URL (for navigation connectors that the node's launch URL depends on the
    node's name).
Returns:
the launch URL.
---
getPriority
public double getPriority( )returns the priority of the node that allows sorting tabs etc.
    coming from different repositories
Returns:
the priority value.
---

TABLE 3-continued

Public Interface of the Navigation Connector getVisualizationType
public int getVisualizationType( )returns the visualization type for this Node. e.g.
    TYPE_IVIEW, TYPE_PAGE, TYPE_FOLDER
--------------------------------------------------------------------------
getDragRelate
public int getDragRelate( )Retrieves a value defining whether the target is Drag & Relate
    target. Returns either REGULAR_TARGET or DRAGANDRELATE_TARGET.
Returns:
value defining whether the target is Drag & Relate target
--------------------------------------------------------------------------
isMergible
public boolean isMergible( )Retrieves a flag indicating whether node can be merged.
--------------------------------------------------------------------------
getMergeID
public java.lang.String getMergeID( )
            throws java.lang.UnsupportedOperationExceptionRetrieves a value of the
    node's merge ID. This value is used for merging (mainly for display purposes)
    between navigation nodes.
Returns:
merge ID value.
--------------------------------------------------------------------------
getJScript
public java.lang.String getJScript(java.lang.String mode)
            throws java.lang.UnsupportedOperationExceptionretrieves the Java Script
    that needs to run when event described by the mode is fired. Currently,
    ON_DROP_EVENT_HANDLER is only supported.
Parameters:
mode - defines what event is this Java script handles.
Returns:
the Java script defined for the dragging event. null if no Jscript has been defined.
--------------------------------------------------------------------------
getJScriptId
public java.lang.String getJScriptId(java.lang.String mode)
            throws java.lang.UnsupportedOperationExceptionRetrieves the ID of the
    JavaScript code returned in getDragJScript(mode) (for optimizations).
Returns:
the Java script defined for the dragging event. null if no Jscript has been defined.
--------------------------------------------------------------------------
getPRTEvent
public java.lang.String getPRTEvent(java.lang.String mode)
            throws java.lang.UnsupportedOperationExceptionRetrieves the PRT
    event that corresponds with the mode. Used if a PRT event should be triggered in
    the URL built for the corresponding JScript returned by getJScript with the same
    mode.
Parameters:
mode - UnsupportedOperationException a connector that is not related to the PRT
Returns:
PRT event that corresponds with the mode.
--------------------------------------------------------------------------
getShowType
public int getShowType( )Retrieves a value defining the node's show type. returns either
    SHOW_INPLACE or SHOW_EXTERNAL.
Returns:
node's show type.
--------------------------------------------------------------------------
getWindowName
public java.lang.String getWindowName( )
            throws java.lang.UnsupportedOperationExceptionRetrieves the window
    Name of the launched external window. Is used only if the show type is
    SHOW_EXTERNAL.
Returns:
window Name of the launched external window.
Throws:
java.lang.UnsupportedOperationException - Window name cannnot be returned for inplace
    defined nodes.
--------------------------------------------------------------------------
getExtWindowHeight
public int getExtWindowHeight( )
            throws java.lang.UnsupportedOperationExceptionRetrieves the height of the
    external window if node is defined to launch externally. The measurment unit is
    pixel.
Returns:
the height of the external window if launched externally.
Throws:
java.lang.UnsupportedOperationException - width is not supported or node defined to be
    launched in place.
--------------------------------------------------------------------------

TABLE 3-continued

Public Interface of the Navigation Connector getExtWindowWidth
public int getExtWindowWidth( )
        throws java.lang.UnsupportedOperationExceptionRetrieves the width of the
    external window if node is defined to launch externally. The measurment unit is
    pixel.
Returns:
the width of the external window if launched externally.
Throws:
java.lang.UnsupportedOperationException - width is not supported or node defined to be
    launched in place.
--------------------------------------------------------------------------------
public interface IClientNavigationGenerator
Title: Navigation Client Generator Description: Creates client calls for Navigation
--------------------------------------------------------------------------------
Field Summary
static int SHOW_EXTERNAL
    Parameter defining the launching of the navigation node will be performed in an
        external (new) STANDALONE window.
static int SHOW_EXTERNAL_PORTAL
    Parameter defining the launching of the navigation node will be performed in an
        external (new) PORTAL window.
static int SHOW_INPLACE
    Parameter defining the launching of the navigation node will be performed in the
        same window.
  Method Summary
java.lang.String createAbsoluteNavigateClientCall(java.lang.String navTarget, int mode,
    java.lang.String winFeatures, java.lang.String winName)
      Creates a client call for Absolute navigate operation to the navigation target
java.lang.String createObjectNavigateClientCall(java.lang.String system, java.lang.String
    objType, java.lang.String objValue)
      Creates a client call for Object Based navigate operation.
Field Detail
SHOW_INPLACE
public static final int SHOW_INPLACE - Parameter defining the launching of the
    navigation node will be performed in the same window.
--------------------------------------------------------------------------------
SHOW_EXTERNAL
public static final int SHOW_EXTERNAL - Parameter defining the launching of the
    navigation node will be performed in an external (new) STANDALONE window.
--------------------------------------------------------------------------------
SHOW_EXTERNAL_PORTAL
public static final int SHOW_EXTERNAL_PORTAL - Parameter defining the launching of
    the navigation node will be performed in an external (new) PORTAL window.
Method Detail
createAbsoluteNavigateClientCall
public java.lang.String createAbsoluteNavigateClientCall(java.lang.String navTarget,
              int mode,
              java.lang.String winFeatures,
              java.lang.String winName)Creates a client call for
    Absolute navigate operation to the navigation target
Parameters:
navTarget - the navigation url to navigate to.
mode - the mode in which the navigation will be performed.
winFeatures - additional client windows properties (for exteranal window)
Returns:
client call for Absolute navigate operation to the navigation target
--------------------------------------------------------------------------------
createObjectNavigateClientCall
public java.lang.String createObjectNavigateClientCall(java.lang.String system,
              java.lang.String objType,
              java.lang.String objValue)Creates a client call for Object
    Based navigate operation.
Parameters:
system - the system the object defined for.
objType - the type of the object the navigation is request for.
objValue - the value of the object the navigation is request for.
Returns:
client call for Object Based navigate opeartion.
--------------------------------------------------------------------------------

The connectors 432, 434, 436 can be registered to the navigation service 420 using the INavigationConnectorRegistration interface. The connectors can use the connector interface (e.g., INavigationConnector) defined by the navigation service and can return nodes according to the navigation node definition (e.g., INavigationConnectorNode). Navigation nodes can be returned by the connectors already sorted.

A role connector 432 can connect with role management and user authorization components of the enterprise portal. The role connector 432 can provide data related to roles a current user belongs to. A KM connector 434 can connect with a knowledge management (KM) platform used with the enterprise portal. The KM connector 434 can provide data related to knowledge management operations, such as providing taxonomies to be presented as a navigation tree, allowing a user to easily navigate documents sought in the KM application. Other connectors 436 can connect with other applications, such as Web Dynpro or CRooms Collaboration Application, both provided by SAP AG of Walldorf, Germany.

Connectors can be implemented for new applications, which can be plugged into a portal system. Thus, information from any number of different applications can be viewed using a single portal with a unified navigation presentation, and information views used to present the information from the different applications need not understand the details of how data is represented and/or communicated by the different application sources of information. The connectors can be implemented as a service that registers with the navigation service. This registration can be performed using an existing portal registry, and the navigation service can retrieve the connectors from the portal registry. Other aspects of the navigation model architecture described can also be performed using other parts of an enterprise portal as well.

Navigation data retrieval can involve requesting initial nodes from the connectors. The returned nodes can be merged and sorted. A request for a specific node can be dispatched to the corresponding navigation connector as defined by a connector identifier included in the node (e.g., a URL prefix set by the navigation service). Further investigation of the navigation node can be performed using the navigation node access functions (e.g., getchildren( ), getRelatedItems( ), etc.).

Some standard navigation iViews can be supplied. A Top Level Navigation (TLN) iView 412 can display the highest level or levels of a user's hierarchical navigation structure. A Detailed Navigation (DTN) iView 414 can display the hierarchical structure of the navigation levels starting from the higher levels. One or more related iViews 416 can also be provided to display standardized object linking relationships. For example, an iView can be provided to display Drag and Relate targets that are relevant to content displayed in a work area. The Drag and Relate targets can be configured by the content developer using a target editor in an application designer program used to construct new iViews and edit pages. Another iView can be provided to display "See Also's", which are links that are relevant to the content displayed in the work area. The See Also's can be configured by the content developer using a "See Also" editor in the application designer program.

Figure 5:
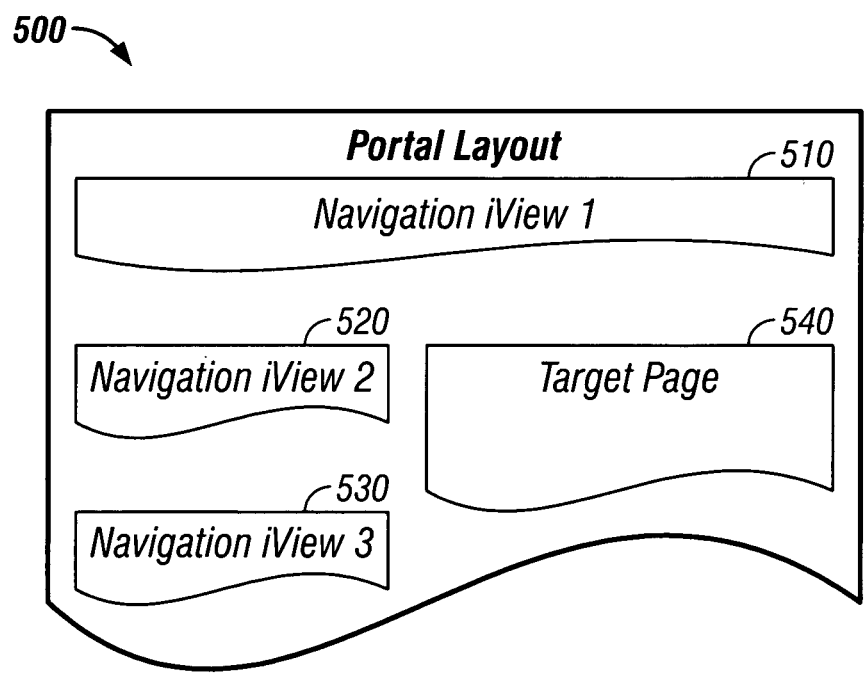
FIG. 5 illustrates an example portal presentation.

FIG. 5 illustrates an example portal presentation 500. The presentation 500 has a layout specified by the portal. The layout defines how the user can navigate in the portal. The navigation layout can be a regular portal page built from iViews, which describe the navigation visualization. The layout can include a first navigation iView 510, which can be TLN iView. The layout can also include additional navigation iViews 520, 530, which can be DTN iViews used to select navigation nodes. These navigation iViews can present a united navigation hierarchy of navigation nodes in the form of a graphical hierarchical structure of expanding/collapsing containers and unit nodes, which can be used to launch application units in one or more other windows, which can be iViews. A target page window 540 present a work area that can display a launched navigation node.

The portal layout presentation 500 can be a Web-based page using HTML (Hypertext Markup Language) and HTTP (Hypertext Transfer Protocol). Using the portal platform, a wide range of applications can be displayed in a single page in a browser. The portal layout presentation 500 can include various user interfaces, such as menu bars and favorites links, both in the main window level and in the sub-windows used to present application information.

Figure 6:
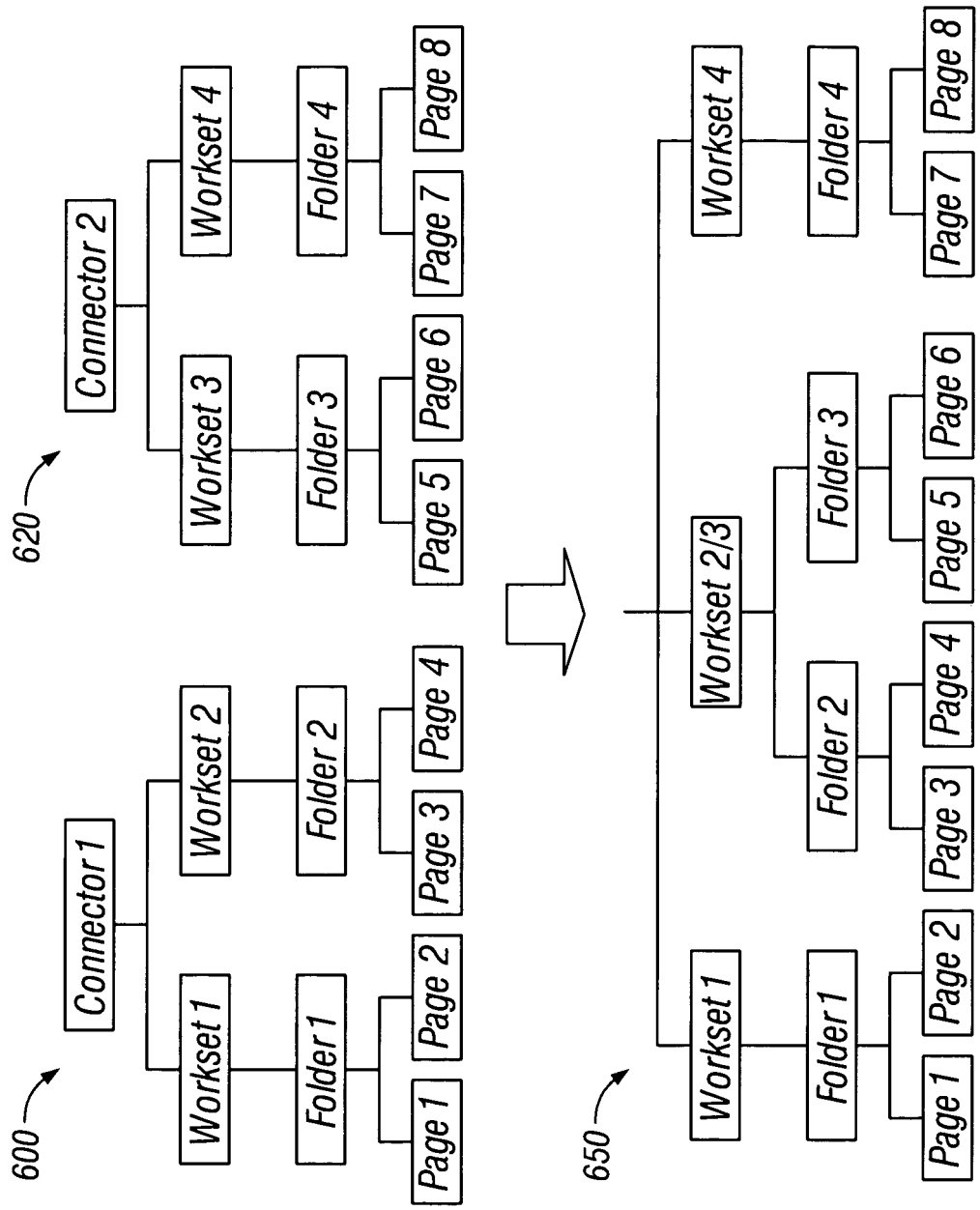
FIG. 6 illustrates unification and merging of navigation hierarchies from different application sources.

Nodes from different origins can be merged, sorted and provided to the iViews as if taken from the same source. FIG. 6 illustrates unification and merging of navigation hierarchies from different application sources. A first navigation hierarchy 600 can be retrieved from connector one, and a second navigation hierarchy 610 can be retrieved from connector two. Both navigation hierarchies 600, 610 include worksets, folders, and pages. Uniting and merging the navigation hierarchies 600, 610 results in a united navigation hierarchy 650.

Merging the two navigation hierarchies 600, 610 can be performed by the navigation service as follows. The navigation hierarchies 600, 610 can be joined at their roots, and nodes on the same level of the resulting hierarchy that have the same merge identifier can be merged into a single node, the children and related links of the previous two nodes being combined in the new single node. As shown, worksets 2 and 3 have been merged in the unified navigation hierarchy 650.

Alternatively, the navigation hierarchies 600, 610 can be joined using designated entry points, which are nodes in the retrieved navigation hierarchies that are marked as potential points of entry (e.g., potential root nodes) into the retrieved navigation hierarchies. The navigation service can be asked to provide navigation entry points, and in response obtain the entry points from the connectors. If two or more entry points from the unified list of nodes have the same merge identifier, the navigation service merges those nodes into one node with a new identifier. When a navigation client asks for the children of that node, the navigation client can be supplied with a unified list of all child nodes of all the entry point nodes that were merged. Also, if two or more of those child nodes have the same merge identifier, those nodes can be merged into one node, etc.

The merge identifier(s) can be specified by a system administrator and/or the source applications. Having the same merge identifier indicates that two nodes relate to the same issue, and so it makes sense to show their contents together. Merging nodes as described, allows content in a similar category from two applications to be displayed in one list. Navigation hierarchies from several different application sources can be merged. The different application sources can be local sources or remote sources accessible over a network. The merging of navigation hierarchies can be performed in a portal environment as described, where user roles can be taken into account when merging. For example, a roles connector can use the user roles to determine which navigation node to return for a user. Moreover, merging of navigation hierarchies can be performed at various levels within the hierarchies, depending on the implementation.

Figure 7:
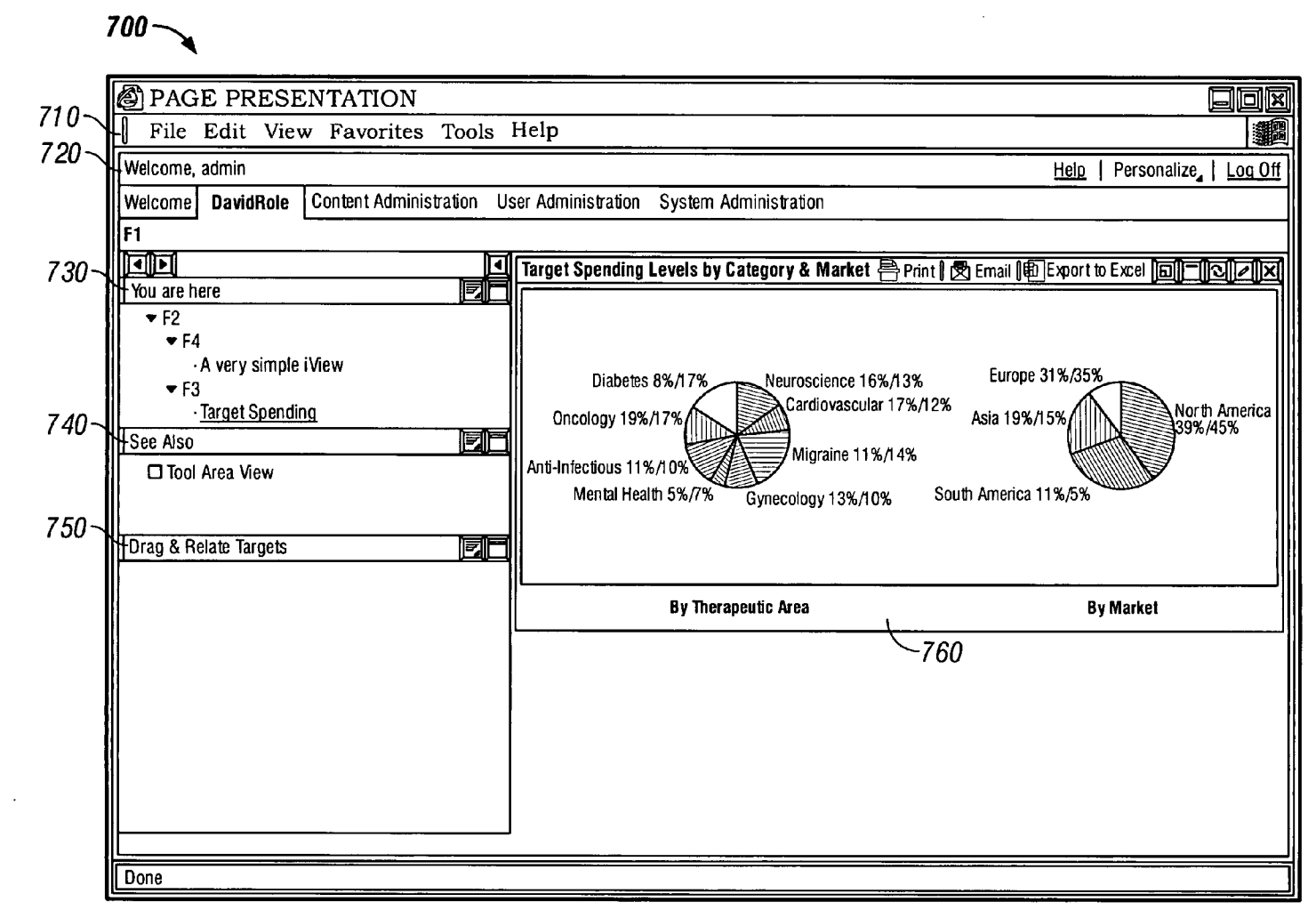

FIG. 7 illustrates an example page in a Web-based portal presentation 700. The portal presentation 700 can be a standard Web browser window and can include a menu bar 710. The portal presentation 700 also includes navigation areas. A top level navigation area 720 provides role-based and user-based options for a current user. Navigation areas 730, 740, 750 provide a simple point and click user interface to the unified navigation hierarchy. A first navigation area 730 displays a graphical hierarchical structure of expanding/collapsing containers and unit nodes, which can be used to launch application units. Launching from one of the navigation areas can generate a client "navigate" event, which can be caught by the top level navigation which refreshes an inner page 760 with the URL of the launched node.

In the example shown, a "Target Spending" link in the navigation area 730 has been selected, causing a target spending page 760 to be retrieved using the navigation service and displayed in the work area. The node representing the target spending application unit includes a See Also link, which is displayed in the See Also area 740, and no Drag&Relate links are included in the Drag&Relate area 750.

The graphical hierarchical structure used to display the unified navigation hierarchy can be implemented as a tree control as shown, and an HTMLB (HTML-Business for Java) tree control can be used as well. HTMLB is a markup language provided by SAP AG of Walldorf, Germany. The unified hierarchy can be loaded dynamically, loading initial levels first and loading additional levels on an expand user event. The dynamic loading can be configurable, including a configurable number of initially loaded levels. Data communications can use the XML (extensible Markup Language) format. Other features that can be implemented include a collapse/expand all feature, a path display feature that shows the path to the active node and all upper level nodes, and a dynamic root feature that enables a user to set a node as the new root for display. Moreover, an administrator can use a role editor to edit what the role navigation connector returns for users that belong to a particular role.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., a data server), a middleware component (e.g., an application server), and a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a personal area network ("PAN"), a mobile communication network, and/or the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. The logic flows depicted in FIG. 1 do not require the particular order shown, or sequential order, to achieve desirable results. In certain implementations, multitasking and parallel processing may be preferable.

Other embodiments may be within the scope of the following claims.

What is claimed is:

1. A portal system comprising:
an integration layer comprising a navigation service module residing on a first programmable machine, the navigation service module defining a connector interface and;
a data layer comprising a plurality of application sources, each of the application sources creating an application-specific hierarchy, the plurality of application sources residing on one or more additional programmable machines that communicate over a network with the navigation service module on the first programmable machine, and an equal number of navigation connectors to the navigation service, each one of the plurality of application sources providing one of the navigation connectors by implementing the defined connector interface on the one or more additional programmable machines and by generating one or more navigation nodes that represent data objects in the each one of the plurality of application sources; and
a presentation layer that resides on the first programmable machine and that comprises one or more navigation applications that obtain navigation information from the navigation service module, the navigation service module uniting the navigation nodes provided by the plurality of navigation connectors to provide a homogeneous view of navigation information from the plurality of application sources by uniting the application-specific navigation hierarchies from each of the plurality of application sources into a unified, consistent application hierarchy that is presented to one or more clients running on one or more client machines.

2. The portal system of claim 1, wherein the navigation connectors include connector identifiers that are included in the navigation nodes to provide the navigation information.

3. The portal system of claim 1, wherein the navigation connectors generate the navigation nodes according to the navigation object model to provide the navigation information, the navigation nodes including at least one merge identifier that indicates similar content in two navigation nodes from different application sources and that results in a merger of the two navigation nodes.

4. The portal system of claim 1, wherein the navigation nodes include a linking relationship to other nodes that are not in a parent child relationship in the homogeneous view of the navigation information.

5. The portal system of claim 1, wherein the navigation service module is configured to read data from the different application sources using the navigation connectors but not to write data to the different application sources using the navigation connectors.

6. The portal system of claim 1, wherein the navigation service module dynamically loads a united navigation hierarchy when providing the homogeneous view of the navigation information.

7. The portal system of claim 6, wherein a role editor allows setting a node as a new root of the united navigation hierarchy for display for users that belong to a role.

8. The portal system of claim 1, wherein the navigation service module further comprises INavigationService means for abstracting navigation operations, the connector interface comprises INavigationConnector means for plugging an application into the INavigationService means, and the navigation data interface comprises INavigationNode means for accessing navigation information from the different application sources.

9. The portal system of claim 1, wherein one or more of the plurality of application sources are chosen from a group consisting of Web services, an enterprise base system, a human resource management system, a customer relationship management system, a financial management system, a knowledge management system, a business warehouse system, a time management system, and an electronic file or mail system.

10. A method comprising:
   operating one or more navigation applications residing on a first programmable machine in a presentation layer of a navigation model architecture, a navigation service module residing on the first programmable machine in an integration layer of the navigation model architecture, and a plurality of application sources residing on one or more additional programmable machines in a data layer of the navigation model architecture, the one or more additional programmable machines communicating over a network with the navigation service module on the first programmable machine, each of the application sources creating an application-specific hierarchy;
   implementing a connector interface on the one or more additional programmable machines, the connector interface being defined by the navigation service module and causing each of the plurality of application sources to provide one navigation connector to the navigation service for each of the plurality of application sources, each navigation connector providing one or more navigation nodes that represent data objects in the one of the plurality of application sources that provides the navigation connector; and
   uniting the navigation nodes to provide, via the one or more navigation applications, a homogeneous view of navigation information from the plurality of application sources by uniting the application-specific navigation hierarchies from each of the plurality of application sources into a unified, consistent application hierarchy.

11. The method of claim 10, further comprising accepting one of the plurality of navigation connectors at the navigation service by receiving a registration request from the one of the navigation connectors, receipt of the registration request resulting in the navigation service having an identifier for the one of the navigation connectors, and receiving the navigation information by receiving the navigation nodes from the one of the navigation connectors, as defined by the navigation object model, the received navigation nodes including the connector identifier.

12. The method of claim 11, further comprising selecting the one of the plurality of navigation connectors to contact based on one of the connector identifiers.

13. The method of claim 10, further comprising providing a unified navigation area by displaying a navigation window in a portal presentation, the navigation window including navigation links to resources of the different application sources, the navigation links being organized according to the united navigation hierarchy.

14. The method of claim 10, further comprising:
   receiving a navigation action; and
   changing at least one of the navigation nodes in accordance with the received navigation action.

15. The method of claim 10, wherein uniting the navigation hierarchies further comprises merging at least two navigation objects from the different application sources based on a merge identifier.

16. The method of claim 15, wherein the united navigation hierarchy comprises a graph of linking relationships among navigation objects.

17. The method of claim 10, wherein uniting the navigation hierarchies further comprises dynamically loading the united navigation hierarchy.

18. The method of claim 10, wherein one or more of the plurality of application sources are chosen from a group consisting of Web services, an enterprise base system, a human resource management system, a customer relationship management system, a financial management system, a knowledge management system, a business warehouse system, a time management system, and an electronic file or mail system.

19. An article comprising a machine-readable medium storing instructions operable to cause one or more machines to perform operations comprising:
   operating one or more navigation applications residing on a first programmable machine in a presentation layer of a navigation model architecture, a navigation service module residing on the first programmable machine in an integration layer of the navigation model architecture, and a plurality of application sources residing on one or more additional programmable machines in a data layer of the navigation model architecture, the one or more additional programmable machines communicating over a network with the navigation service module on the first programmable machine, each of the application sources creating an application-specific hierarchy;
   implementing a connector interface on the one or more additional programmable machines, the connector interface being defined by the navigation service module and causing each of the plurality of application sources to provide one navigation connector to the navigation service for each of the plurality of application sources, each navigation connector providing one or more navigation nodes that represent data objects in the one of the plurality of application sources that provides the navigation connector; and
   uniting the navigation nodes to provide, via the one or more navigation applications, a homogeneous view of navigation information from the plurality of application sources by uniting the application-specific navigation hierarchies from each of the plurality of application sources into a unified, consistent application hierarchy by merging two or more of the navigation nodes from two or more of the application sources that are related to a same issue.

20. The article of claim 19, further comprising accepting one of the plurality of navigation connectors at the navigation service by receiving a registration request from the one of the navigation connectors, receipt of the registration request resulting in the navigation service having an identifier for the one of the navigation connectors, and receiving the navigation information by receiving the navigation nodes from the one of the navigation connectors, as defined by the navigation object model, the received navigation nodes including the connector identifier.

21. The article of claim 20, wherein the operations further comprise selecting the one of the plurality of navigation connectors to contact based on one of the connector identifiers.

22. The article of claim 19, further comprising providing a unified navigation area by displaying a navigation window in a portal presentation, the navigation window including navigation links to resources of the different application sources, the navigation links being organized according to the united navigation hierarchy.

23. The article of claim 19, wherein the operations further comprise:
 receiving a navigation action; and
 changing at least one of the navigation nodes in accordance with the received navigation action.

24. The article of claim 19, wherein uniting the navigation hierarchies further comprises merging at least two navigation objects from the different application sources based on a merge identifier.

25. The article of claim 24, wherein the united navigation hierarchy comprises a graph of linking relationships among navigation objects.

26. The article of claim 19, wherein uniting the navigation hierarchies further comprises dynamically loading the united navigation hierarchy.

27. The article of claim 19, wherein one or more of the plurality of application sources are chosen from a group consisting of Web services, an enterprise base system, a human resource management system, a customer relationship management system, a financial management system, a knowledge management system, a business warehouse system, a time management system, and an electronic file or mail system.

* * * * *